United States Patent [19]
Lehrheuer et al.

[11] 3,766,633
[45] Oct. 23, 1973

[54] METHOD OF JOINING METALS OF DIFFERENT MELTING POINTS

[75] Inventors: Werner Lehrheuer, Aachen; Rudolf Lison, Kohlscheid, both of Germany

[73] Assignee: Kernforschungsanlage Julich, Julich, Germany

[22] Filed: Dec. 8, 1971

[21] Appl. No.: 206,004

[30] Foreign Application Priority Data
Dec. 10, 1970 Germany............... P 20 60 728.7

[52] U.S. Cl.................. 29/470.5, 29/478, 29/482, 285/286
[51] Int. Cl............................................ B23k 31/02
[58] Field of Search................ 29/478, 479, 494, 29/470.5, 470.6, 482, 483; 285/286, 328, 330

[56] References Cited
UNITED STATES PATENTS
1,993,269  3/1935  Fletcher........................ 29/479 X
2,174,218  9/1939  Greene.......................... 29/479 X
3,436,805  4/1969  Friske et al.................... 29/494 X
3,436,806  4/1969  Supan........................... 29/494 X Primary Examiner—Richard B. Lazarus
Attorney—Karl F. Ross

[57] ABSTRACT

A system for joining metals of different melting points, in which the high-melting-point metal is provided with a form-fitting formation including a recess overhung by the formation and is pressed into the low-melting-point metal, both bodies being heated in vacuo at a temperature in which the low-melting-point metal is at least softened or made pasty so that its metal flows into the recess or around the formation. The heating is maintained until a diffusion welding zone is formed between the two bodies.

3 Claims, 3 Drawing Figures

METHOD OF JOINING METALS OF DIFFERENT MELTING POINTS

FIELD OF THE INVENTION

Our present invention relates to a method of joining workpieces having different melting points and, more particularly, to a system for making a hermetical and effective mechanical joint between two metal bodies composed of materials of different melting points.

BACKGROUND OF THE INVENTION

Various processes have been proposed for joining metal bodies in the formation of mechanically stable hermetical junctions. Aside from the mechanical couplings known heretofore — using bolted or clamped flanges, screw thread and bayonet fittings, and pressed or tapered joints —, there have been numerous systems involving diffusion welding, transition piece welding, soldering and sweating. In systems of the latter type, a low-melting-point metal is provided between the two workpieces and is caused to flow into a gap between them. This system which has had wide-spread utility, is not effective for many metals including aluminum and stainless steel. It has been suggested to use deposition welding in which a welding wire, rod or powder produces weld metal in the form of a bead at the junction between two different metals of the respective bodies. Deposition-welding processes are expensive, have a tendency to yield defective welds and cannot conveniently be carried out.

Thus, with metals such as stainless steel and aluminum or aluminum-magnesium alloys, for example, it has been proposed to carry out diffusion welding whereby two surfaces are brought together in vacuo and are heated until some molecular or atomic interdiffusion occurs at the interface. One difficulty with this method is that there is a tendency toward the development of intermetallic phases adjacent the interface as a result of solubilization of one metal in the other to produce so called solid solutions. Especially when one metal is iron, steel or an iron or steel alloy and the other metal is an aluminum alloy, the development of intermetallic phases results in a deterioration of the mechanical properties of the joint.

While diffusion processes which are conducted under conditions preventing the formation of intermetallic solid solution zones to any great extent have proved to be desirable, the mechanical characteristics of diffusion joints leave much to be desired. In practice, such joints are insufficiently strong and stable to withstand pressure, temperature and mechanical stress. In these cases, moreover, the diffusion zone is limited to a depth of less than $5 \times 10^{-3}$ mm.

The problem is especially significant when the two bodies to be joined are tubes or pipes which may be subjected to high pressures and frequently must undergo temperature variation within a wide range. To date, the most effective junction with pipe of different melting points, has been to interfit the pipes and then carry out a diffusion welding at the junction.

OBJECTS OF THE INVENTION

It is the principal object of the present invention to provide an improved method of joining two metallic workpieces, especially two workpieces composed of metals of different melting point, in which an improved junction, capable of resisting mechanical, thermal and pressure stresses, is created.

It is another object of the invention to provide a method of making an improved junction between metal bodies of different melting point in which the junction is capable of resisting dislocation in the diffusion zone even when the diffusion bonding is destroyed as, for example, may occur with long-duration overheating of the diffusion zone.

It is an object of the invention also to provide a method of making an improved hermetic junction between two pipe members which is capable of retaining its gas tightness for long periods.

Still another object of the invention is the provision of a method of making of a junction whereby the complex equipment and devices of prior art systems can be avoided.

Still further, it is an object of our invention to provide a method of joining bodies composed of different metals to form a junction capable of withstanding the stress of temperature fluctuations.

Yet another object of the invention is to provide a system for making a junction between bodies of different melting points in which the boides can have the same internal and external diameters after being joined.

SUMMARY OF THE INVENTION

These objects and others which will become apparent hereinafter, are attainted in accordance with the present invention, in a system for joining a body of one metal of a high melting point, e.g. stainless steel, to a body of lower melting point, e.g. aluminum or an aluminum alloy, which comprises forming the body of high melting point along a surface juxtaposed with the body of low melting point with a serration, tooth or other form-fitting configuration adapted to be embedded in the material of lower melting point to produce a tight junction between the bodies. According to the invention, the bodies are pressed together and heated with at least the junction in vacuo to a temperature in which the low-melting-point body is softened and the material thereof is plastically deformed around the formation by material flow and in a pasty or doughy state of the low-melting-point material. This temperature and pressure are maintained for an additional period sufficient to produce a diffusion layer at the junction. The junction is capable of resisting high transverse stresses and also provides a substantially permanent hermetic seal, is insensitive to temperature variations within a wide range.

According to another feature of the invention, the bodies are annular and are formed with confronting surfaces at axial ends of the bodies, the serrations being annular and including at least one tooth which, at least in part, overhangs an annular recess of the high-melting-point body. Thus, when the material of the low-melting-point body flows into the recess, the overhanging head of the high-melting-point body and the underlying material of the low-melting-point body cooperate to resist axial stress and abut in the axial direction to resist transverse stresses. The diffusion zone is formed not only between the confronting faces generally but also between the materials of the toothed formations or serrations formed at the junction.

Still another feature of the invention resides in retaining the shape of the low-melting-point body during the heating and pressing thereof, this body being heated and compressed under conditions which render it plastically flowable as described above. Advantageously, the apparatus for carrying out the process comprises a vacuum chamber in which a piston or plunger is displaceable and a mold structure receiving the low-melting-point body. An induction coil may be provided around the assembly to heat the bodies at their junction.

DESCRIPTION OF THE DRAWING

The above and other objects, features and advantages of the present invention will become more readily apparent from the following description, reference being made to the accompanying drawing in which.

SPECIFIC DESCRIPTION

Figure 1A:
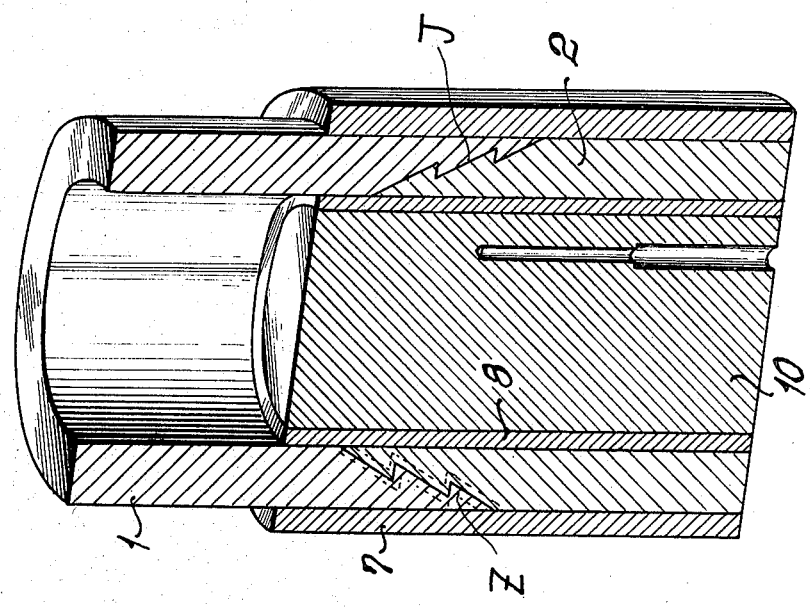
FIG. 1A is a vertical cross-sectional view of a junction between a stainless steel and an aluminum sleeve before the formation thereof showing the formations applied to the two bodies.

In FIG. 1A of the drawing, we have shown a stainless steel sleeve 1 whose lower end 1a is formed with a generally frustoconical concavity 1b which widens outwardly to receive the frustoconical projection 2a of the aluminum-alloy sleeve 2. The interior face of the junction part of sleeve 1 is provided with two teeth 1c and 1d which are annular and are defined by a flank 1e lying in a plane perpendicular to the axis of the sleeves and a frustoconical ramp 1f diverging outwardly from the surface 1e. Above the surface 1e in the axial direction, there is an annular recess 1q which is partly overhung by the tooth.

Figure 1B:
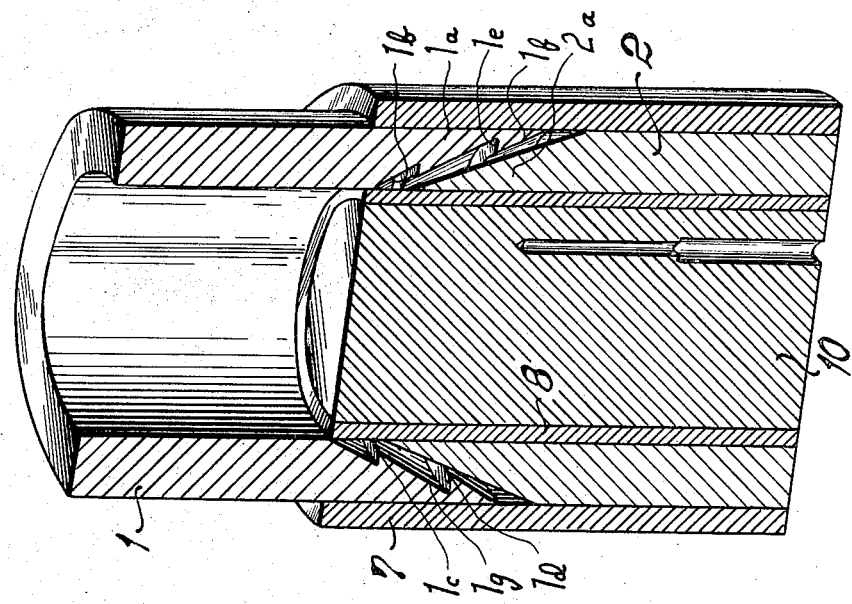
FIG. 1B is a cross-sectional view similar to FIG. 1A, illustrating the junction after formation.

When the sleeve 1 is juxtaposed axially with the sleeve 2 and the latter is held in a steel-forming sleeve 7, while the aluminum sleeve 2 is supported against collapse by a mandrel 10 and its sleeve 8, the application of pressure as represented by the arrows P and the heating of the body 2 to transform it into a pasty state will result in a flow of material from body 2 into the recesses 1q and the creation of the form-fitting junction J illustrated in FIG. 1B. The process is carried out in a vacuum and the temperature and pressure are maintained until a diffusion zone as shown between broken line at Z in FIG. 1B is produced.

Figure 2:
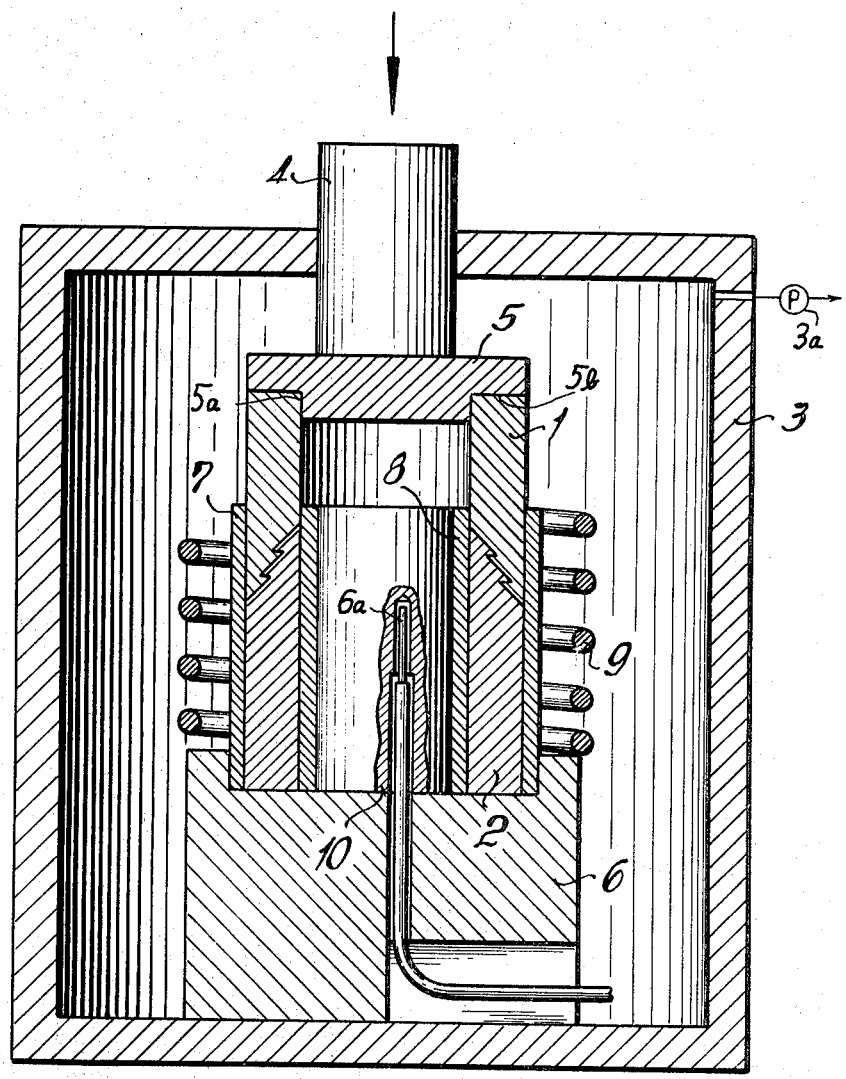
FIG. 2 is a cross-sectional view showing the apparatus in diagrammatic form.

As can be seen from FIG. 2, the apparatus for carrying out the process according to the present invention includes a vacuum chamber 3 which can be evacuated to a pressure of $10^{-3}$ torr. or less via a pump 3a, and which receives a piston 4 carrying the head 5. The latter has a boss 5a receiving the sleeve 1, and an annular shoulder 5b abutting the same. Surrounding the assembly is an induction coil 9 which may be energized by alternating current in the usual manner and the temperature can be monitored by a thermocouple 6a extending into the mantle 10 through the base 6.

SPECIFIC EXAMPLE

An aluminum-magnesium alloy sleeve of an external diameter of 50 mm and composed of ALMg3 alloy, with a length of 45 mm and a wall thickness of 10 mm is machined to provide a taper at one end over a length of 12 mm and with an apex angle of about 60°. A stainless-steel sleeve having an external diameter of 50 mm and an internal diameter of 30 mm with a length of about 38 mm is provided with a similar internal taper and two teeth as shown. The radial depth of the teeth is about 2 – 5 mm. The assembly of sleeves 7 and 8 is produced as shown in FIG. 2 and placed in a vacuum chamber which is evacuated to $10^{-3}$ torr. whereupon the induction coil is used to heat the assembly to a temperature of about 500° C for a period of 10 – 15 minutes. A pressure of 1.5 kp per mm² is applied via a plunger. The flow of material from body 2 around the teeth of body 1 occurs almost immediately and the balance of the period serves to permit diffusion. The sleeves 7 and 8 are then machined away and mandrel 10 is reused. The resulting body 1, 2 can be used to join aluminum pipes to steel vessels, etc.

We claim:

1. A method of joining a first tubular body to a second tubular body of a material having a different melting point from that of the first body, comprising the steps of providing a generally tapering face of said first body with a plurality of teeth of frustoconical configuration; pressing said bodies together and heating same in vacuo with the inner and outer surfaces of the bodies flush with one another to cause material flow of said second body around said teeth ; and maintaining the heating of said bodies in vacuo while supporting said second body internally and externally to permit plastic flow of material thereof only in the region of contact of said bodies to effect diffusion of material of said bodies in the region of said formation whereby the inner and outer surfaces of the bodies are rendered continuous with one another.

2. This method defined in claim 1 wherein said second body has a frustoconical face interfitting axially with said taperiing face and forming a diffusion zone, said teeth being annular and including a recess and a head overlying said recess in the axial direction.

3. The method defined in claim 1 wherein said first body is composed of stainless steel and said second body is composed of aluminum or an aluminum alloy.

* * * * *